United States Patent
Filarsky

(10) Patent No.: US 12,441,357 B1
(45) Date of Patent: Oct. 14, 2025

(54) PROCESSING TRAJECTORIES

(71) Applicant: Zoox, Inc., Foster City, CA (US)

(72) Inventor: Brian Michael Filarsky, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 194 days.

(21) Appl. No.: 18/100,874

(22) Filed: Jan. 24, 2023

(51) Int. Cl.
*B60W 60/00* (2020.01)

(52) U.S. Cl.
CPC ..... *B60W 60/001* (2020.02); *B60W 2710/207* (2013.01); *B60W 2720/10* (2013.01); *B60W 2720/106* (2013.01); *B60W 2720/14* (2013.01); *B60W 2720/20* (2013.01)

(58) Field of Classification Search
CPC ........... B60W 60/001; B60W 2710/10; B60W 2720/10; B60W 2720/106; B60W 2720/14; B60W 2720/20
See application file for complete search history.

(56) References Cited

U.S. PATENT DOCUMENTS

| | | | | |
|---|---|---|---|---|
| 11,886,187 B1* | 1/2024 | Sucan | ................. | B60W 50/023 |
| 11,999,380 B1* | 6/2024 | Funke | ................. | B60W 60/0011 |
| 2020/0156631 A1* | 5/2020 | Lin | ...................... | G05D 1/0257 |
| 2022/0258761 A1* | 8/2022 | Andersen | ............ | B60W 60/001 |
| 2023/0245554 A1* | 8/2023 | Mualla | ................. | G08G 1/0129 |
| | | | | 701/117 |
| 2023/0303126 A1* | 9/2023 | Tamura | ................. | B60W 10/20 |
| 2024/0067209 A1* | 2/2024 | Bárdos | ............... | B60W 60/0011 |
| 2024/0101121 A1* | 3/2024 | Jing | ................. | B60W 50/0097 |

\* cited by examiner

*Primary Examiner* — Peter D Nolan
*Assistant Examiner* — Mikko Okechukwu Obioha
(74) *Attorney, Agent, or Firm* — EIP US LLP

(57) ABSTRACT

Methods of processing trajectories, such as for autonomous vehicles, are provided. A method may comprise receiving a trajectory and identifying a first mode or a second mode as a control mode for controlling the vehicle. The first mode comprises determining a first control value based at least in part on a time and controlling the vehicle based at least in part on the first control value. The second mode comprises determining a second control value for the vehicle based at least in part on a position of the vehicle and controlling the vehicle based at least in part on the second control value. The vehicle may be controlled in accordance with the identified control mode. In some examples the vehicle may be controlled in accordance with the first mode at a first time, and the second mode at a second time.

20 Claims, 6 Drawing Sheets

PROCESSING TRAJECTORIES

BACKGROUND

Autonomous driving may benefit from computing systems capable of determining driving paths and navigating along routes from an initial location toward a destination. For example, autonomous and semi-autonomous vehicles may utilize systems and components to traverse through driving environments including other objects, such as moving or stationary vehicles (autonomous or otherwise), pedestrians, buildings, etc. When traversing through such an environment, the vehicle may determine a trajectory based on sensor data from the perception systems of the vehicle, as well as map data of the environment. For example, a planning system within an autonomous or semi-autonomous vehicle may determine a trajectory and a corresponding set of actions for the vehicle to take to navigate in an operating environment.

BRIEF DESCRIPTION OF DRAWINGS

The detailed description is described with reference to the accompanying figures. The use of the same reference numbers in different figures indicates similar or identical components or features.

DETAILED DESCRIPTION

Figure 1:
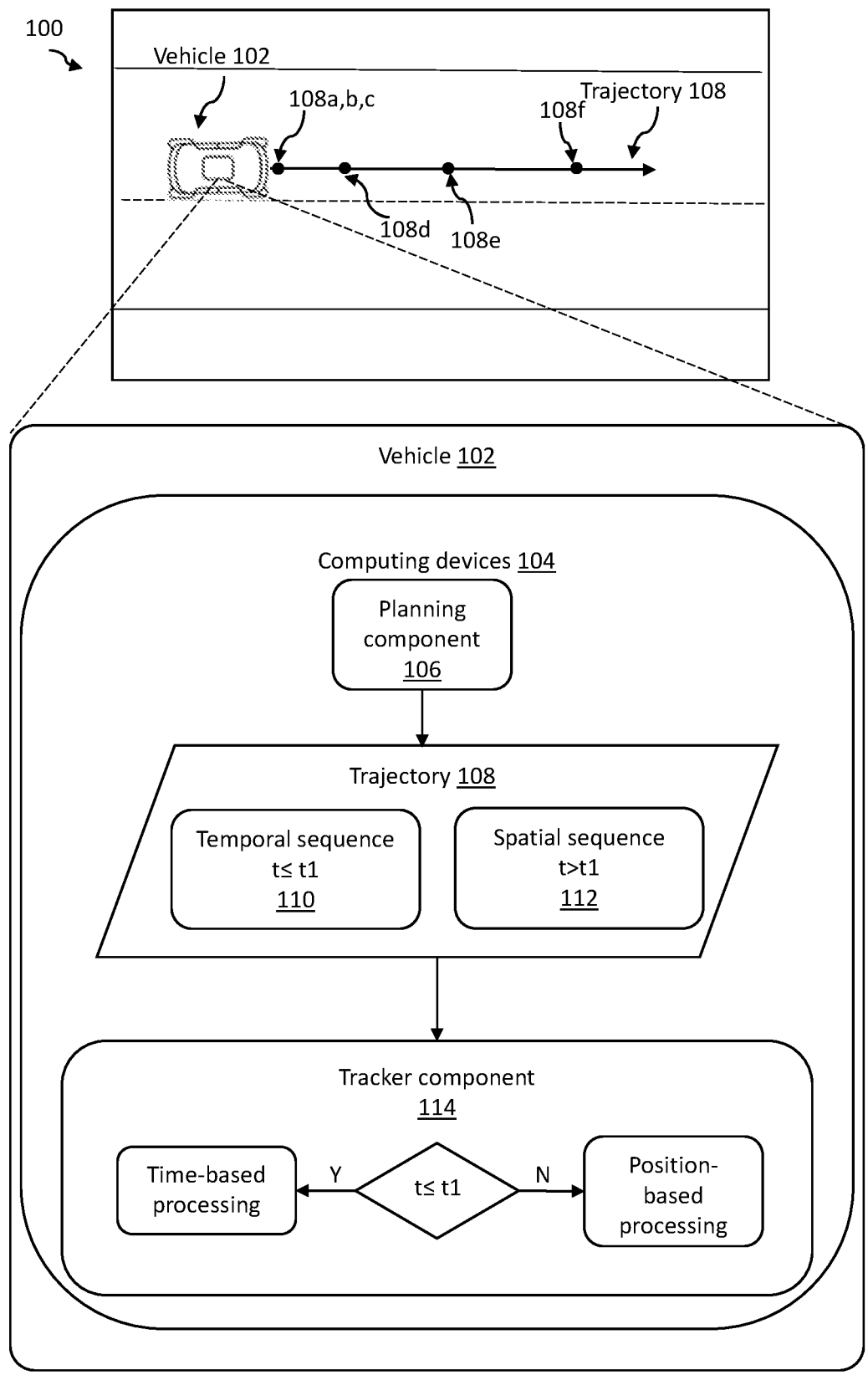
FIG. 1 illustrates a vehicle controlled in accordance with a trajectory having a temporal sequence and a spatial sequence.

This application relates to determining and utilizing driving trajectories for vehicles, such as autonomous and semi-autonomous vehicles. Techniques of the present disclosure may process a trajectory in accordance with one of two modes. A first mode may provide time-based processing of the trajectory. For example, control values for controlling the vehicle may be determined from the trajectory based on a current time of the vehicle. A second mode may provide position-based processing of the trajectory. For example, control values for controlling the vehicle may be determined from the trajectory based on a current position of the vehicle. A control value may define or relate to, for example, a position, yaw, yaw rate, sideslip, velocity, and/or acceleration for the vehicle. A control value may define or relate to a setting associated with a component of a drive system of the vehicle. Which mode of the first mode and second mode to use may be determined, in a non-limiting example, based on a time range defined in the trajectory. For example, the first mode may be utilized in a first time-range, and the second mode may be utilized in a second time range. Different parts of the same trajectory may be processed according to different modes. For example, a trajectory may comprise a sequence of spatial states and a sequence of temporal states. Time-based processing may be used to process the temporal states during a time range associated with the sequence of temporal states. Outside of the time range, position-based processing may be used to process the spatial states. There may be some driving scenarios where one of position-based processing and time-based processing of a trajectory is not possible or is not desirable. Techniques of the present disclosure may allow consistent trajectories (e.g., trajectories defining regularly-spaced states) to be utilized in controlling a vehicle even for driving scenarios where one of position-based processing and time-based processing is not available. Such techniques may provide improved operation of autonomous and semi-autonomous vehicles and/or improved functioning of their associated computer systems. For example, techniques described herein may improve the functioning and efficiency of such vehicles operating in real-world driving environments, by providing improved processing of trajectories controlling progress through the environment. For example, the techniques disclosed herein may provide improved computational efficiency in controlling a vehicle, as a standard form of trajectory may be utilized instead of requiring additional scenario-specific control means.

In some examples, the trajectory may be associated with a stationary vehicle. In one non-limiting example, the trajectory may define acceleration of the vehicle from a stationary position. In a further non-limiting example, the trajectory may define a change of steering angle while the vehicle is stationary ("dry steering"). In some examples, position-based processing may generally be used to process a trajectory. Position-based processing may project a current position of the vehicle onto a path defined by the trajectory, to determine the progress of the vehicle along the intended trajectory and so determine vehicle controls accordingly. The path may represent an intended route for the vehicle to take through the environment. An example of controlling a vehicle based on projection onto a trajectory is described in more detail in US Patent Application No. 2022371613, which is incorporated herein by reference in its entirety for all purposes. Time-based processing may be an alternative to position-based processing. In time-based processing, a trajectory may define specific vehicle controls to be used at specific times. However, in the real-world a vehicle may generally be offset from where it should according to a time-based trajectory, for example due to unexpected variations in speed of the vehicle. Position-based processing may account for this, providing vehicle control based on where the vehicle is rather than where it was expected to be based on time. However, when the vehicle is stationary, its position may not change. Projecting the position onto a path defined in the trajectory may always result in the same trajectory state, for example the first stationary state, with no progress along the trajectory. Thus, for example, it may not be possible to define a change in steering angle while the vehicle is stationary (which, for example, may be used for leaving parking spaces along a preferred trajectory and may also referred to herein as "dry steering"), as position-based processing may always select the initial steering angle defined in the first stationary state, rather than progressing to subsequent steering angles given limitations of the projection operation. Thus, conventionally it may not be possible to control dry steering using a trajectory. Similarly, projecting a position onto a trajectory for accelerating the vehicle from stationary may always result in a stationary state, preventing the vehicle from moving. Conventionally, bespoke processing modes may be required for each such driving scenario, increasing the computational complexity of controlling the vehicle. In techniques of the present disclosure, however, time-based processing may be used in particular circumstances, for example when the vehicle is stationary. For example, the trajectory may define specific steering angles at specific times. The trajectory may be processed according to the current time, yielding steering angles that change with time. The control mode may be switched to position-based processing when the vehicle is no longer stationary, retaining the benefits of position-based processing discussed above.

In some examples, a first mode or a second mode may be identified as a control mode for controlling the vehicle. The vehicle may be controlled in accordance with the control mode. The first mode may comprise time-based processing of the trajectory. For example, the first mode may comprise determining a first control value for the vehicle based on a time, and controlling the vehicle based at least in part on the first control value. The time may be a current time or a future time. The second mode may comprise position-based processing of the trajectory. For example, the second mode may comprise determining, based at least in part on a spatial operation, a second control value for the vehicle based on a position of the vehicle, and controlling the vehicle based at least in part on the second control value. The position may be a current position or a future position. The position may be a projected position, for example a position of the vehicle as projected onto a path defined by the trajectory. In some examples, the first mode or second mode may be identified as the control mode based on determining that a current parameter associated with the vehicle is in a parameter range defined in the trajectory. In a non-limiting example, the current parameter may be a current time, and the parameter range may be a time range. In another example, the current parameter may be a current (actual or projected) position of the vehicle, and the parameter range may be a position range. In other examples, the first mode or second mode may be identified as the control mode based on determining a that a predetermined condition is met. For example, the predetermined condition may relate to one or more specified driving scenarios. The first mode or second mode may be identified as the control mode based on determining that a specified driving scenario (e.g. a stationary vehicle) is defined in the trajectory.

In some examples, the trajectory may comprise a first sequence of states associated with the first mode, and a second sequence of states associated with the second mode. A state of the first sequence of states may specify an expected value of a vehicle parameter at a particular time. The first sequence may be referred to as a temporal sequence. A state of the second sequence of states may specify an expected vehicle parameter at a particular position (e.g. position along the path defined by the trajectory). The second sequence may be referred to as a spatial sequence. In some such examples, a final state of the first sequence of states and an initial state of the second sequence of states may comprise a common control value. Alternatively, a final state of the second sequence of states and an initial state of the first sequence of states may comprise a common control value. Such examples may provide continuity during the transition between processing modes. For example, a steering angle, yaw rate, speed, and/or acceleration may be the same at the end of a time-based processing period and the start of a position-based processing period. Such examples may maintain kinematic feasibility of the trajectory, and may reduce any discomfort caused to passengers in the transition between processing modes. In some examples the states of the temporal sequence may comprise spatial information, such as a position. In some examples the spatial sequence may overlap with the temporal sequence, such that for at least a portion of the trajectory both temporal and spatial states are defined. In such examples, spatial processing may be used even within the time period associated with the temporal sequence. Spatially-derived control values associated with said time period may be replaced with temporally-derived control values.

In some examples, the trajectory may be processed by a tracker component. The tracker component may determine control values from or based on the trajectory. The tracker component may provide control signals to vehicle controllers to modify settings associated with one or more components of a drive system of the vehicle (e.g. motor, engine, transmission, steering components, braking components, etc.), and thus to control the vehicle. In various examples, the tracker component may also modify controls associated with the trajectory based at least in part on the vehicle being offset from an assumed position used in generating the trajectory. A trajectory may define a desired path through an environment, but in practice a vehicle may deviate from the desired path, for example due to environmental conditions, instrumental errors, system biases, and the like. The tracker component may generate controls to move the vehicle back onto the desired path. The tracker component may generate controls based on the desired trajectory and on a current state of the vehicle. In some examples, the tracker component may project a current or future position of the vehicle onto the expected path defined in the trajectory to determine a projected position. The tracker component may determine control values for the vehicle for that projected position, for example yielding control values associated with an expected speed, acceleration, yaw, spatial yaw rate, and/or a position of the vehicle. The tracker component may modify said control values based on the offset between the desired trajectory and a current state of the vehicle. The vehicle may then be controlled based at least in part on the control values. Methods of projection are discussed in more detail below. An example tracker component is described in more detail in US Patent Application No. 2022371613, which is incorporated herein by reference in its entirety for all purposes.

Some examples may comprise generating the trajectory, for example by a planning component of the vehicle. Other examples may comprise receiving a trajectory comprising a spatial sequence of states, and generating a temporal sequence of states associated with at least a portion of the spatial sequence of states. For example, a planning component may generate a trajectory comprising the spatial sequence, and the tracker component may generate the temporal sequence. In a non-limiting example, the tracker component may generate a temporal component comprising stationary states associated with acceleration of the vehicle from a stationary position, which may for example be appended at the start of a received spatial sequence. The trajectory may be generated based at least in part on a maneuver to be performed by the vehicle. For example, when a planning component determines that the vehicle should perform a maneuver from a predetermined group of maneuvers, it may generate a trajectory comprising both a spatial sequence and a temporal sequence. Alternatively, the tracker component may generate a temporal sequence based at least in part on determining that a received trajectory defines a maneuver from a predetermined group of maneuvers. A temporal sequence and/or a time range associated with it may be defined for example based on known properties of the vehicle. For example, the temporal sequence, and/or a time range associated with the temporal sequence may be determined based at least in part on a processing delay associated with generating and/or processing a trajectory, an actuation delay associated with a vehicle drive system, and/or rate limits associated with the vehicle drive system (such as rate limits on changing the steering angle).

In some examples, the trajectory may be a reference trajectory, for example generated by a planning component of the vehicle. The reference trajectory may be generated by an optimization process, such as an optimization algorithm or smoothing algorithm. An optimization algorithm may optimize a base trajectory based on one or more policies, such as safety or comfort policies. In other examples, the trajectory may be a trajectory generated based on a reference trajectory. For example, the trajectory may be generated by a secondary system, for example for collision avoidance. Such a trajectory may be a contingent trajectory, for example defining a safe stop trajectory for the vehicle.

Further discussion of methods of trajectory generation and optimization are described in U.S. patent application Ser. No. 17/900,258, filed Aug. 31, 2022, and entitled "Trajectory Optimization in Multi-Agent Environments", which is incorporated herein by reference in its entirety for all purposes.

As used herein, spatial processing of the trajectory may comprise projecting a position (e.g. a current position or an expected future position) of the vehicle onto an expected path through the environment defined by the trajectory. The position may be determined based at least in part on one or more sensor measurements performed by sensors of the vehicle 102, such as a GPS sensor, lidar sensor, and/or cameras. The sensor measurements may be provided to a localization component of the vehicle 102. The localization component may determine the position from the sensor measurements, and may provide the position for processing the trajectory, for example by the tracker component. The tracker component may project the position onto the path defined by the trajectory to determine the closest point on the path to the position. For example, the tracker component may determine the shortest distance between the position and the path. In such cases, the point on the path to the position may be the projected position. In some examples the tracker component may estimate a position of the vehicle along the path at a future time from the current closest point so that vehicle controls may be based on a desired future state of the vehicle. In such examples the estimated position may be considered the projected position. In some cases the projected position may correspond to a state specifically defined in the trajectory. The state may define a set of desired parameters for the vehicle at that position, such as a desired speed, acceleration, yaw, spatial yaw rate etc. The tracker component may determine control values for controlling the vehicle based at least in part on these desired parameters. In other cases the projected position may be between states defined in the trajectory. In such cases the tracker component may interpolate between the states to determine the desired properties for the projected position. For example, if a projected position is halfway between two states of the trajectory, a desired speed may be the mid-point between speeds defined by the adjacent states. The tracker component may determine control values based on such interpolated desired properties.

As used herein, temporal processing of the trajectory may comprise determining controls for vehicle based at least in part on a time associated with the vehicle (e.g. a current time, at which the processing is being performed, or a future time, such as a predetermined delay after the current time). The temporal sequence of the trajectory may define control values, or desired vehicle parameters, as a function of time. In some cases, the current/future time may match the time of a defined state in the trajectory. In such cases the controls may be determined directly from the defined state. In other cases, the current/future time may fall between times of defined states. Such cases may use temporal interpolation to determine the controls. For example, if the current/future time is halfway between the times associated with two adjacent states in the trajectory, a desired speed at the current/future time may be determined as the midpoint between the speeds defined in the two adjacent states.

The techniques described herein may be implemented in a number of ways. Example implementations are provided below with reference to the following figures. Although discussed in the context of an autonomous vehicle, the methods, apparatuses, and systems described herein may be applied to a variety of systems (e.g., a sensor system or a robotic platform), and are not limited to autonomous vehicles. In one example, similar techniques may be utilized in driver-controlled vehicles in which such a system may provide an indication of whether it is safe to perform various maneuvers. In various other examples, the techniques may be utilized in an aviation or nautical context, and may be incorporated into any ground-borne, airborne, or waterborne vehicle using route planning techniques, including those ranging from vehicles that need to be manually controlled by a driver at all times, to those that are partially or fully autonomously controlled.

Figure 2:
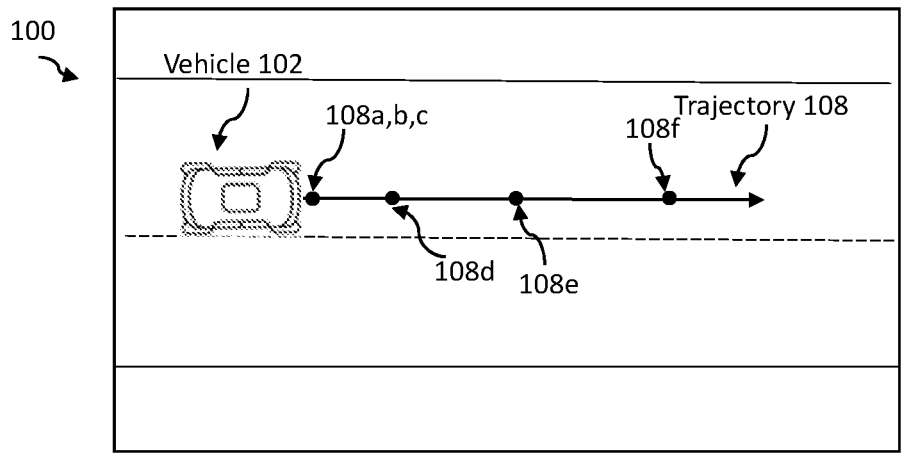
FIG. 2 further illustrates the trajectory shown in FIG. 1.
Figure 2:
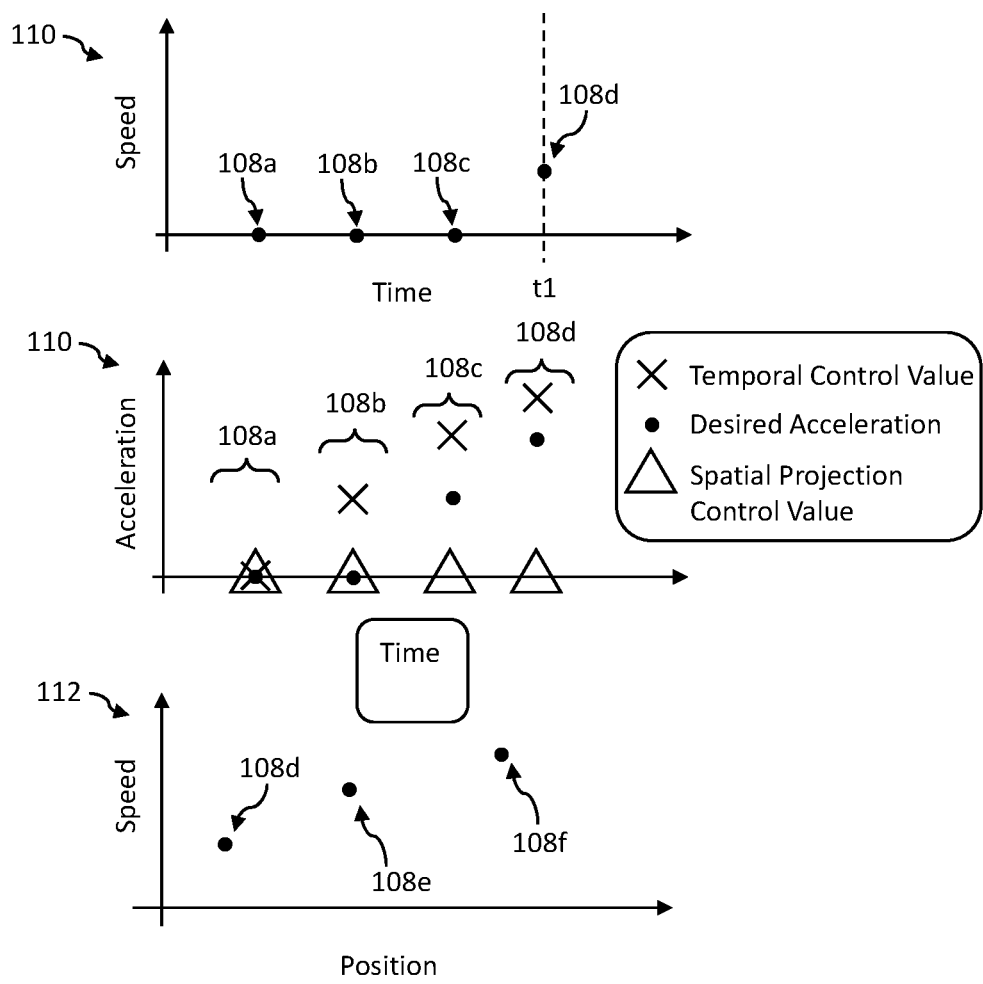

FIGS. 1 and 2 illustrate an example driving scenario 100 including an autonomous vehicle 102 configured to perform the techniques described herein. In some instances, the autonomous vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 102 may be a fully or partially autonomous vehicle having any other level or classification.

The autonomous vehicle 102 may comprise computing device(s) 104 that may include one or more ML models and/or the navigation systems discussed below in relation to FIG. 6. For example, the computing device(s) 104 may comprise a planning component 106. The planning component 106 may be configured to generate a trajectory 108 for the vehicle 102. The planning component 106 may include trajectory optimization components configured to perform stochastic optimization and/or other optimization techniques to determine an optimal path for the autonomous vehicle 102 to traverse a driving environment. The planning component 106 also may include, or may invoke, one or more prediction components (e.g., an active prediction ML model) and/or cost evaluation components configured to analyze trajectories that the autonomous vehicle 102 may follow. In the illustrated example, the trajectory 108 generated by the planning component 106 may be received by a tracker component 114. The tracker component may be configured to generate control signals based on the trajectory 108. The control signals may control the vehicle to approximately follow the trajectory 108 and/or return the vehicle 102 to the trajectory 108 if offset therefrom. In other examples a trajectory generated by the planning component may be received by a secondary system, for example a secondary system configured to detect and avoid potential collisions. The secondary system may validate and optionally modify the trajectory from the planning component 106 to generate the trajectory 108 received by the tracker component 114.

An example trajectory 108 is illustrated in the example scenario 100. The trajectory may comprise a plurality of states 108a-f. Each state may define parameters associated with control of the vehicle in the environment. For example, a state may define one or more of a position (e.g. a position along a path defined by the trajectory), a speed, an acceleration, a vehicle heading/yaw, a yaw rate, and a sideslip. As illustrated in example scenario 100, in some examples the trajectory 108 may define acceleration from an initial stationary position. There may be a delay between generation of a trajectory 108, and actuation of drive systems of the vehicle 102, for example due to a processor delay. To accommodate this delay, the trajectory 108 may define a number of stationary states 108a-c, i.e. states at which the vehicle 102 is to remain stationary. A first moving state 108d may be defined for after the expected delay time.

In conventional position-based tracking systems, a tracker component 114 may process a received trajectory 108 by projecting a position (e.g. a current position) of the vehicle 102 onto an expected path through the environment defined by the trajectory 108. In FIG. 1, the path is represented by the solid line of the trajectory 108. However, the initial stationary states 108a-c of trajectory 108 may all represent the same position in space, i.e. the starting position of the vehicle 102. Thus, when projecting the current position of the vehicle 102 onto the trajectory 108, it may not be possible to distinguish between the separate states 108a-c. For example, projection may always yield the first state 108a, without progressing through the further states 108b-f to accelerate the vehicle.

In techniques of the present disclosure, however, the trajectory 108 may comprise two (or more) distinct sequences of states. A first sequence of states may be a temporal sequence 110, associated with time-based processing of the trajectory 108. A state of the temporal sequence of states 110 may define a vehicle parameter (e.g. speed, yaw/steering angle, etc.) at a specific time or times. A second sequence of states may be a spatial sequence 112, associated with position-based processing of the trajectory 108. A state of the spatial sequence of states 112 may define a vehicle parameter at a particular position along a path defined by the trajectory 108. In the illustrated example, the temporal sequence 110 may be used to control the vehicle 102 whilst it is stationary and, optionally, during an initial acceleration. The spatial sequence 112 may then be used to control the vehicle 102 as it continues to move away from the initial position of the vehicle 102. The tracker component 114 may thus progress through the initial stationary states 108a-c based on the current time, and then progress through moving states 108d-f of the trajectory 108 based on current position.

The two distinct sequences of states 110, 112 of the example scenario 100 are further illustrated in FIG. 2. FIG. 2 illustrates an expected speed of the vehicle 102 defined by the states 108a-f (or that may be derived from the states 108a-f). The temporal sequence of states 110 may in this example comprise the states 108a-d. The spatial sequence may comprise the states 108d-f. In other words, each sequence may comprise a common state 108d, defining a common speed for the vehicle 102. Utilizing the common state 108d may provide continuity in the transition between the temporal sequence 110 and the spatial sequence 108d.

The temporal sequence 110 may be associated with a first time period. The spatial sequence 112 may be associated with a second time period. In the illustrated example, the temporal sequence 110 may be associated with times before a transition time t1. The spatial sequence 112 may be associated with times after the transition time t1. Thus, in this example the second period of the spatial sequence 112 may follow immediately after the first period of the temporal sequence 110. In other examples, the spatial sequence 112 may be before the temporal sequence 110. In still other examples, the first time period may be defined by a start time and an end time. Any time not falling within the period defined by the start time and the end time may be considered the second time period. In other words, the tracker component 114 may in some examples default to position-based processing unless the current time is within a time window associated with the temporal sequence 110. In some examples, the first and/or second time period may be explicitly defined in the trajectory. In other examples, the first time period may be determined from the range of times associated with states of the temporal sequence. For example, the first time period may be the time range between a first time associated with an initial state of the temporal sequence, and a second time associated with a final state of the temporal sequence. Of course, any number of ranges are contemplated such that controls within such ranges are determined in accordance with the temporal determinations. Additionally or alternatively, such ranges may, in at least some examples, be provided as a sequence of times such that controls are determined for any one or more of the times provided in the sequence and such controls override any spatial determined controls within the range of times determined from the sequence. Such sequences may have times spaced linearly, non-linearly, etc. In at least some examples, the sequence of times may not correspond to a set of states associated with the spatial-based mode and/or the states/controls associated with the received trajectory.

As shown in FIG. 1, the trajectory 108 may be received by a tracker component 114. The tracker component 114 may determine one or more control values based on the trajectory 108. The control values may be defined in states of the trajectory 108 or may be derived therefrom. The tracker component 114 may determine whether a current time associated with the vehicle 102 is within the first time period associated with the temporal sequence 110. If the current time is within the first time period, the trajectory 108 may be processed by time-based processing. Time-based processing may comprise determining, based on the current time, a control value for controlling the vehicle from the temporal sequence of states 110. Determining a control value may comprise determining a parameter defined in a state 108a-d of the temporal sequence 110, such as a state 108a-d associated with a time closest to the current time. In other examples, determining the control value may comprise temporally interpolating between two adjacent states 108a-d of the temporal sequence of states 110 based on the current time. For example, the control value may be determined based on interpolating between values of a parameter defined in the two adjacent states 108a-d based the proportion of time between the adjacent states 108a-d that has passed at the current time. Interpolating may comprise linearly interpolating. The control value may be the value of the parameter defined in a state 108a-d, or as interpolated from adjacent states 108a-d. Alternatively the control value may be derived from said value of the parameter. For example, where the parameter is associated with speed of the vehicle 102, the control value may be associated with an acceleration required to reach such a speed.

If, on the other hand, the tracker component 114 determines that the current time is not in the first range associated with the temporal sequence 110 (or determines that the current time is in a second range associated with the spatial sequence 112), the tracker component 114 may process the trajectory 108 using position-based processing. For example, the tracker component 114 may project a current (actual) position of the vehicle onto a path defined by the trajectory 108 to determine a projected position. The tracker component 114 may determine a control value from the spatial sequence of states 112 based at least in part on the projected position. The current actual position of the vehicle may be determined from sensor data, for example sensor data measured by one or more sensors of the vehicle 102. The projected position may be the position on the path with the shortest perpendicular distance to the actual position of the vehicle 102. Determining a control value may comprise determining a parameter defined in a state 108*d-f* of the spatial sequence 112, such as a state 108*d-f* associated with a position along the path closest to the projected position. In other examples, determining the control value may comprise spatially interpolating between two adjacent states 108*d-f* of the spatial sequence of states 112 based on the projected position. For example, the control value may be determined based on interpolating between values of a parameter defined in the two adjacent states 108*d-f* based the proportion of total distance (e.g., path length) between the adjacent states 108*d-f* represented by the projected position, though any spacing is contemplated (e.g., linear, non-linear, base on events, based on controls, vehicle states, or the like). Interpolating may comprise linearly interpolating. The control value may be the value of the parameter defined in a state 108*d-f*, or as interpolated from adjacent states 108*d-f*. Alternatively the control value may be derived from said value of the parameter.

In either case, the tracker component 114 may cause the vehicle to be controlled in accordance with the determined control value. For example, the tracker component 114 may generate a control signal based at least in part on the determined control value, the control signal for controlling one or more components of a drive system of the vehicle. In some examples, the tracker component 114 may provide the control value (e.g., as part of a control signal) as a command to a vehicle controller. For example, the control value may specify a setting for one or more components of the drive system, such as commanding a steering angle or motor speed. In other examples, a control value may specify an expected value of a vehicle parameter at a future time. The tracker component 114 may generate a control signal for controlling the vehicle based on a difference between the expected value and the future time and a current actual value of that parameter. In a non-limiting example, the vehicle parameter may be associated with speed of the vehicle 102. The control signal may be associated with an acceleration required to reach the expected speed at the expected time/position associated with the future state.

In some examples, a control value may be determined from the trajectory based on a position of the vehicle (position-based processing) even during the first period associated with the temporal sequence 110. When the time is in the first period, an additional control value may also be determined based on the time (time-based processing). In such examples, states 108*a-f* in a trajectory 108 may be associated with a position along the path defined in the trajectory 108. The control value determined from position-based processing may be replaced with the additional control value, and the vehicle may be controlled based at least in part on the additional control value. For example, the control value may relate to an expected speed at a future point in time, such as the speed expected at the next state in the trajectory 108. As discussed above, for a stationary vehicle this expected speed may be zero due to the spatial overlap of the stationary states of the trajectory 108. The additional control value determined from the time-based processing may relate to a non-zero speed. The zero-speed control value may be replaced with the non-zero speed additional control value, such that the vehicle may be controlled to achieve the non-zero speed by accelerating from the stationary position. Such examples may provide computational efficiency, as a first software component may perform position-based processing at all times, without any modification to operate only during certain times. A second, separate software component may determine if the current time is in the first time range, perform the temporal-based processing if appropriate, and overwrite the control value generate by the first software component. Using such separate components may be simpler, and thus more efficient to process, than using a single component that switches between position-based and time-based processing. Further, using separate software components may facilitate upgrading of systems that already implement position-based processing. In some examples, multiple control values may be determined by spatial processing during the period associated with the temporal sequence 110. One or more of such control values may be retained, i.e. not replaced by temporally-derived values, and may be used to control vehicle 102. Thus, control of the vehicle during the temporal period may be based on both temporally-derived control values and spatially-derived control values. Such examples may maintain the advantages of position-based processing for some types of control, while providing temporally-derived controls where needed.

FIG. 2 illustrates the processing of states 108*a-f* of the trajectory 108 in the example scenario 100. In this example, each state 108*a-f* may be associated with an expected speed of the vehicle. States 108*a-d*, representing the temporal sequence 110, may specify expected speeds at particular points in time. Alternatively or additionally, states 108*a-d* may specify expected accelerations, for example set such that the vehicle reaches the expected speeds by the expected times. The second graph in FIG. 2 illustrates the accelerations commanded by states 108*a-d*, as discussed further below. States 108*a-d* may be defined up to the end of the time period associated with temporal-processing, in this example from the start of the trajectory 108 to the time t1. States 108*a-c* may define stationary positions of the vehicle, with zero speed. Using temporal-based processing, the tracker component 114 may progress through these states 108*a-c* as the current time progresses. The state 108*d* has a non-zero expected speed. As the current time approaches the time associated with the state 108*d*, the tracker component 114 may generate control signals that start the vehicle accelerating to reach the expected speed at the expected time. After the time t1, the tracker component 114 may switch to position-based processing. The states 108*d-f* may define expected speed for specified positions along a path defined by the trajectory 108. The tracker component 114 may generate control signals based on the position of the vehicle, in the illustrated example continuing to accelerate the vehicle as it moves along the path towards the position associated with state 108*f*. As discussed above, state 108*d* may be common to both the temporal sequence 110 and the spatial sequence 114, which may provide continuity at the transition between processing modes. The process of determining whether the current time falls within the first time range associated with the temporal sequence 110, and processing the trajectory 108 accordingly, may be repeated a number of times. For example, the trajectory component 114 may generate a control value at each of a plurality of processing ticks. At each tick the trajectory component 114 may determine whether to process the trajectory in accordance with time-based processing or position-based processing based on the current time at that tick.

FIG. 2 also illustrates accelerations associated with the temporal sequence 110. The acceleration graph in FIG. 2 shows three distinct acceleration types for each state 108a-d. The circles represent the acceleration desired at the time associated with each state 108a-d. As shown, the first two states 108a-b may have zero speed and zero desired acceleration. For example, these states 108a-b may be associated with processing delays associated with calculating the trajectory and/or actuating the vehicle 102, where the vehicle is expected to remain stationary. The third state 108c may also have a zero speed, and thus may be considered a stationary state. However, it may be desired to start moving the vehicle 102 soon after the time associated with state 108c. Thus it may be desired to have a non-zero acceleration at the time associated with state 108c. By state 108d, the vehicle may be moving with non-zero speed, and a non-zero acceleration. As the spatial position of the vehicle is now changing, spatial projection can be used, and so future control values may be based on the spatial sequence of states 112.

In some examples, the acceleration control values determined from the states 108a-d may be the desired acceleration for that point in time, i.e. the circles in the acceleration graph in FIG. 2. However, other examples may account for delays in actuating the vehicle 102 when determining the control value. Accordingly, in some examples a control value determined for a first state may be based on a desired parameter (e.g. acceleration) of the vehicle at a subsequent state (or a future time or future position). For example, a control value determined for a first state may be based on a desired parameter of the vehicle at the immediately subsequent state, or at a time that is a predetermined delay time after the time associated with the first state. Thus, in the illustrated example, an acceleration control value determined for a state 108a-d may differ from the desired acceleration at the time associated with that state 108a-d. In particular, the acceleration control value for one state 108a-d may be based, at least in part, on the desired acceleration associated with a next state 108a-d. Example accelerations set by the control values determined from temporal processing of the states 108a-d are illustrated by crosses in the acceleration graph in FIG. 2. For example, although it may be desired that the speed and acceleration at the time associated with the state 108b should be zero, the control value determined from state 108b may set an acceleration that matches the desired acceleration associated with state 108c.

To illustrate a benefit of temporal processing, the triangles in the acceleration graph of FIG. 2 show the acceleration control values that may have been derived based on spatial-processing alone of the states 108a-d. As discussed above, the states 108a-c are all at the same spatial position. Using spatial projection alone there may be no way to distinguish between the states 108a-c. As a result, spatial projection may always return control values associated with the first state 108a. The exemplary first state 108a is a stationary state with zero speed and zero desired acceleration. The next exemplary state 108b also has a zero desired acceleration. Thus, an acceleration control value determined for state 108a may set a zero acceleration. As time progresses, the vehicle 102 remains at the same spatial position. At the time associated with the second state 108b, the vehicle 102 is still at the same initial position, and so spatial projection may again return control values based on the first state 108a. The vehicle may therefore never be provided with an acceleration, and so may never move from the initial position, and so spatial projection may always yield the control values for the first state 108a. Thus, as illustrated by the triangles in FIG. 2, the vehicle 102 may never achieve a non-zero acceleration based on spatial projection, and so may never move away from the initial position.

Figure 3:
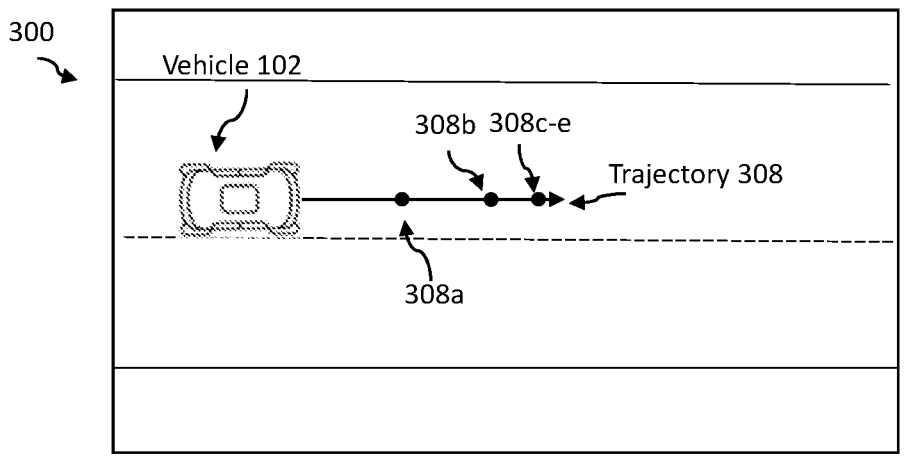
FIG. 3 illustrates an alternative trajectory, associated with dry steering of a vehicle.
Figure 3:
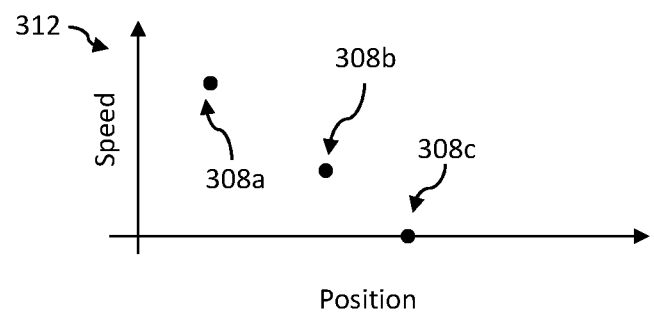
Figure 3:
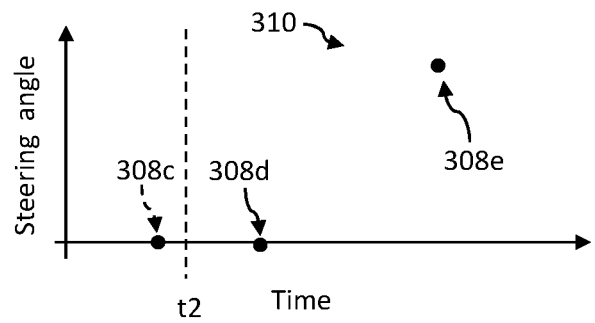

FIG. 3 illustrates a further example driving scenario 300. In this example, the vehicle 102 is initially moving, and is brought to a stop. While stopped, a steering angle is changed (dry steering). A trajectory 308 may be provided to the tracker component 114 defining such a driving scenario. The trajectory 308 may comprise a plurality of states 308a-c. States 308a-c may represent a spatial sequence 312. These states 308a-c may specify a speed of the vehicle 102 as a function of position along a path defined by the trajectory 308. As discussed above, the tracker component 114 may project a current position of the vehicle 102 onto the path to determine a projected position and may determine a control value from the spatial sequence 312 based on the projected position. In the illustrated example, a control value determined from states 308a-308c may be associated with a deceleration of the vehicle, bringing the vehicle to a halt at approximately the position associated with state 308c.

The trajectory 308 may further comprise states 308d and 308e. States 308d-e may represent a temporal sequence 310. States 308d-e may specify a steering angle of the vehicle 102 as a function of time. The trajectory 308 may define a time period in which time-based processing is to be used. The states 308d-e may be defined for times within that time period. In the illustrated example, the time period may be from a time t2 until the end of the trajectory 308. The time t2 may be set to ensure it falls after the vehicle has reached a stationary position, for example allowing for deviations from the deceleration profile expected in the spatial sequence 312. In alternative examples, the time period may be the time between the initial temporal state 308d and the final temporal state 308e. When tracker component 114 determines that the current time is within the time period (e.g. is after t2), it may process the trajectory 308 using time-based processing. In this example, the state 308d may define an initial steering angle. The initial steering angle may be the same as a steering angle defined by the final state of the spatial sequence 308c, which may provide continuity during the processing mode transition. The state 308e may define a final steering angle. At each processing tick, the tracker component 114 may perform time-based interpolation between the states 308d-e based on the current time to determine an expected steering angle for that tick. The tracker component 114 may then generate a control signal to control the vehicle 102 accordingly.

In the examples described above, the trajectories 108, 308 have comprised both a temporal sequence of states 110, 310 and a spatial sequence of states 112, 312. In other examples, a trajectory may comprise only a temporal sequence 110, 310; or only a spatial sequence 112, 312. The tracker component 114 may determine whether the current time falls within the temporal time period at each tick, as described above. Alternatively, the tracker component 114 may determine whether the current time falls within the temporal time period at different, for example periodic intervals. In some examples, in particular where a trajectory comprises only one of a temporal sequence and a spatial sequence, the tracker component 114 may determine which processing mode to utilize upon receiving the trajectory, and may only determine the processing mode again when a further trajectory is received.

The examples above have determined the processing mode based on time, determining that a current time is within a time period associated with the temporal sequence of states 110, 310. In general, however, the determination of which processing mode to use may be based on any other factor or consideration. For example, the determination may be based on a current position of the vehicle, such as switching to time-based processing when the vehicle reaches a particular spatial position. The determination may be based on a characteristic of the trajectory 108, 308, such as whether the trajectory 108, 308 comprises a spatial sequence or a temporal sequence. For example, the tracker component 114 may determine that a state or states of a trajectory 108, 308 specify a time (optionally in addition to a position), and if so may perform time-based processing. The determination may be based on a driving scenario or maneuver defined in the trajectory 108, 308. For example, the tracker component 114 may determine that a trajectory 108, 308 controls the vehicle to be stationary, and if so may utilize time-based processing. In any of the examples discussed herein, the trajectory, or a temporal sequence of states of the trajectory, may be generated based at least in part on a desired maneuver to be performed by the vehicle. The desired maneuver may for example be a maneuver determined by a planning component, for example to progress the vehicle along a route. In some examples, the trajectory or temporal sequence of states may be generated based at least in part on identifying that a desired trajectory is in a predetermined group of desired trajectories. The predetermined group may comprise one or more specific maneuvers and/or one or more classes of maneuvers. For example, the group may comprise maneuvers in which the vehicle is stationary. In some examples, the predetermined group of maneuvers may comprise accelerating from a stationary position or changing a steering angle while the vehicle is stationary.

Figure 4:
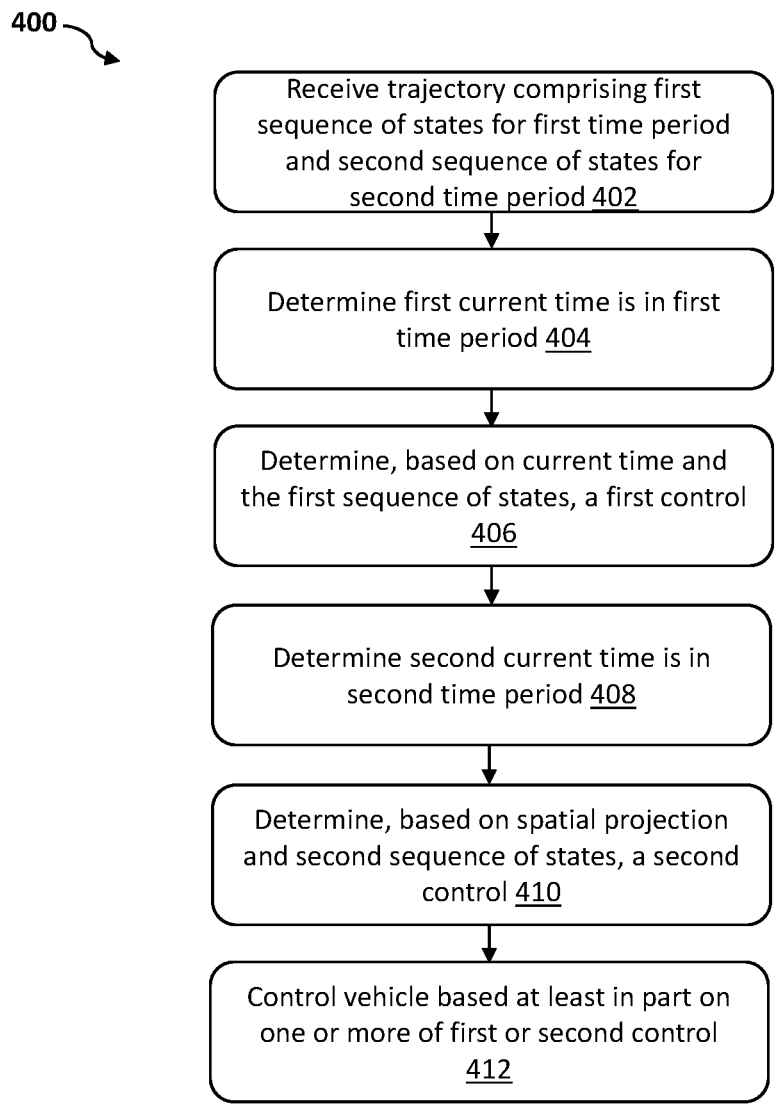
FIG. 4 is a flowchart illustrating an example method according to techniques of the present disclosure.

FIG. 4. is a flow diagram illustrating an example method 400 according to techniques of the present disclosure. The method 400 may be performed by components of a vehicle, such as vehicle 102 described above or vehicle 502 described below. For example, method 400 may be performed by at tracker component of a vehicle. Method 400 may be used to perform the techniques described above in relation to FIGS. 1-3.

Method 400 may comprise operation 402. At operation 402, a trajectory for controlling an autonomous vehicle may be received. The trajectory may be received in some examples from a planning component of the vehicle, or from a secondary system such as a system for avoiding collisions. The trajectory may comprise a first sequence of states for controlling the vehicle in a first time period. The trajectory may comprise a second sequence of states for controlling the vehicle outside of the first time period.

Method 400 may comprise operation 404. Operation 404 may comprise determining that a first time is in the first time period. The first time may be a time at which operation 404 is performed, or associated with performance of operation 404. The first time may be a current time or a future/projected time. For example a future time may be used when considering future behavior of the vehicle based on the trajectory, such as for performing a safety check on the trajectory.

Method 400 may comprise operation 406. Operation 406 may comprise determining, based at least in part on the first time, a first control for controlling the vehicle from the first sequence of states. The first control may be a control value (e.g. a specific value of a parameter associated with the vehicle). The first control may be an instruction associated with control of the vehicle. The first control may be determined using any of the techniques described above in relation to FIGS. 1-3. For example, determining the first control may comprise interpolating between adjacent states of the first sequence of states based on the current time. In some examples, multiple controls may be determined based at least in part on the first time. A control may define or relate to a position, steering angle, yaw, yaw rate, sideslip, velocity, and/or acceleration for the vehicle. A control may define or relate to a setting associated with a component of a drive system of the vehicle. A control may specify an expected value of a parameter of the vehicle, such as position, speed etc., for the first current time or for a future time. Method 400 may further comprise controlling the vehicle based at least in part on the first control, as discussed further below in relation to operation 412.

Operations 404-406 may be repeated multiple times, for example until the time is no longer in the first time period. For example operations 404-406 may be performed periodically until the end of the first sequence of states of the trajectory is reached.

Method 400 may comprise operation 408. Operation 408 may comprise determining that a second time outside of the first time period, for example is in a second time period. The second time may be a time at which operation 408 is performed or associated with performance of operation 410. The second time may be a current or future/projected time.

Method 400 may comprise operation 410. Operation 410 may comprise determining, based at least in part on a spatial projection of the vehicle at the second time and the second sequence of states, a second control. For example, operation 410 may comprise projecting a position of the vehicle at the second time onto a path defined by the second sequence of states to determine a projected position on the path. The path may represent an intended route for the vehicle to take through the environment. Operation 410 may further comprise receiving or determining the current position of the vehicle, for example based on measurements recorded by sensors of the vehicle. The second control may be determined using any of the techniques described above in relation to FIGS. 1-3. For example, determining the second control may comprise interpolating between adjacent states of the first sequence of states based on the projected position. In some examples, multiple controls may be determined based at least in part on the spatial projection.

Method 400 may comprise operation 412. Operation 412 may comprise controlling the vehicle based at least in part on the first control and/or the second control. Controlling the vehicle may comprise providing a control signal to a drive system of the vehicle. The control signal may be determined based at least in part on the respective first or second control. The control signal may comprise the respective first or second control. The control signal may be based at least in part on a difference between an expected current or future value of a vehicle parameter defined in the control, and a current value of the parameter. The drive system may operate mechanical systems of the vehicle based at least in part on the control signal.

Operations 408-410 may be repeated multiple times, for example until the time is no longer in the second time period, or until the end of the time associated with the trajectory. For example operations 408-410 may be performed periodically until the end of the second sequence of states of the trajectory is reached.

It is to be noted that the operations 402-412 of method 400 may be performed in a different order to that presented in FIG. 4. In particular, operations 408-410 may be performed before operations 404-406, for example where time-based processing follows after position-based processing. Further, operation 412, where it comprises controlling the vehicle based at least in part on the first control, may be performed after operation 406 and before operation 408.

Figure 5:
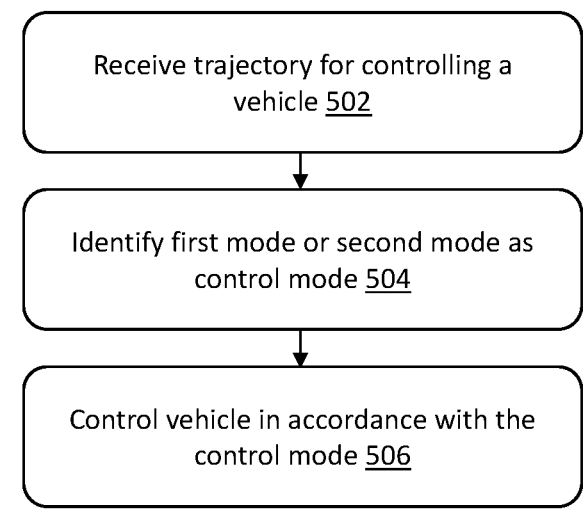
FIG. 5 is a flowchart illustrating a further example method according to techniques of the present disclosure.

FIG. 5. is a flow diagram illustrating an example method 500 according to techniques of the present disclosure. The method 500 may be performed by components of a vehicle, such as vehicle 102 described above or vehicle 502 described below. For example, method 500 may be performed by at tracker component of a vehicle. Method 500 may be used to perform the techniques described above in relation to FIGS. 1-3.

Method 500 may comprise operation 502. Operation 502 may comprise receiving a trajectory for controlling a vehicle. For example, the trajectory may be received from a planning component or a secondary system of the vehicle. The trajectory may comprise a plurality of states defining expected properties of the vehicle at particular positions along a path and/or times. Multiple trajectories may be received, each covering a particular range of times or positions. Where multiple trajectories are received, the steps 504 and 506 below may be performed for each trajectory in turn.

Method 500 may comprise operation 504. Operation 504 may comprise identifying a first mode or a second mode as a control mode for controlling the vehicle. The first mode may comprise determining, based at least in part on the trajectory and a first time, a first control for the vehicle, and controlling the vehicle based at least in part on the first control. In other words, the first mode may comprise time-based processing of the trajectory. The first time may be a current time, or a future/projected time. The second mode may comprise determining, based at least in part on the trajectory and a first position of the vehicle, a second control, and controlling the vehicle based at least in part on the second control. The first position may be a current position or a future position of the vehicle. The first position may be a projected position, for example a position of the vehicle as spatially projected onto path defined by the trajectory. In other words, the second mode may comprise position-based processing of the trajectory. Identifying the first mode or second mode as the control mode may comprise determining that a current parameter associated with the vehicle, such as a current time, is within a range associated with the first mode defined in the trajectory, such as a time range associated with the first mode.

Method 500 may comprise operation 506. Operation 506 may comprise controlling the vehicle in accordance with the identified control mode.

Operations 504 and 506 repeated multiple times, for example periodically. Operations 504 and 506 may be performed for once for each received trajectory, or multiple times for each received trajectory. Some examples may comprise controlling the vehicle in accordance with the first mode at a first time, and controlling the vehicle in accordance with the second mode at a second time. In other words, the control mode may be switched during the course of a journey, or during processing of a single trajectory.

Figure 6:
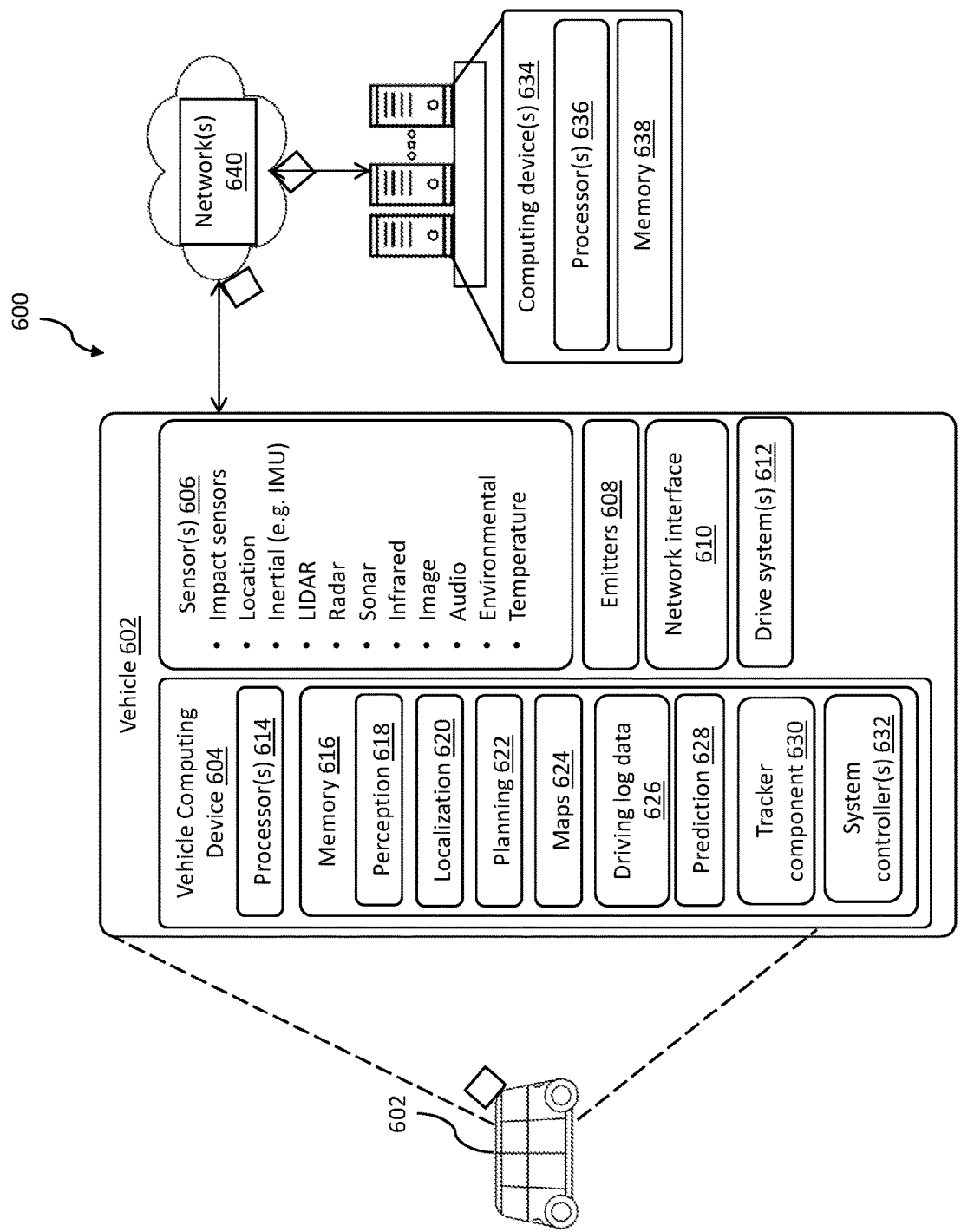
FIG. 6 is a block diagram of an example system for implementing the techniques of described herein.

FIG. 6 illustrates a block diagram of an example system 600 that may implement the techniques discussed herein. In some instances, the example system 600 may include a vehicle 602. In some instances, the vehicle 602 may be an autonomous vehicle configured to operate according to a Level 6 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 602 may be a fully or partially autonomous vehicle having any other level or classification. Moreover, in some instances, the techniques described herein may be usable by non-autonomous vehicles as well.

The vehicle 602 may include a vehicle computing device (s) 604, sensor(s) 606, emitter(s) 608, network interface(s) 610, and/or drive system(s) 612. Sensor(s) 606 may represent sensor(s) 112. The system 600 may additionally or alternatively comprise computing device(s) 634.

In some instances, the sensor(s) 606 may represent sensor (s) 112 and may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 606 may include multiple instances of each of these or other types of sensors. For instance, the radar sensors may include individual radar sensors located at the corners, front, back, sides, and/or top of the vehicle 602. As another example, the cameras may include multiple cameras disposed at various locations about the exterior and/or interior of the vehicle 602. The sensor(s) 606 may provide input to the vehicle computing device(s) 604 and/or to computing device(s) 634.

The vehicle 602 may also include emitter(s) 608 for emitting light and/or sound, as described above. The emitter (s) 608 may include interior audio and visual emitter(s) to communicate with passengers of the vehicle 602. Interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 608 may also include exterior emitter(s). Exterior emitter(s) may include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 602 may also include network interface(s) 610 that enable communication between the vehicle 602 and one or more other local or remote computing device(s). The network interface(s) 610 may facilitate communication with other local computing device(s) on the vehicle 602 and/or the drive component(s) 612. The network interface (s) 610 may additionally or alternatively allow the vehicle to communicate with other nearby computing device(s) (e.g., other nearby vehicles, traffic signals, etc.). The network interface (s) 610 may additionally or alternatively enable the vehicle 602 to communicate with computing device(s) 634 over a network 640. In some examples, computing device(s) 634 may comprise one or more nodes of a distributed computing system (e.g., a cloud computing architecture).

The vehicle 602 may include one or more drive components 612. In some instances, the vehicle 602 may have a single drive component 612. In some instances, the drive component(s) 612 may include one or more sensors to detect conditions of the drive component(s) 612 and/or the surroundings of the vehicle 602. By way of example and not limitation, the sensor(s) of the drive component(s) 612 may include one or more wheel encoders (e.g., rotary encoders)

to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 612. In some cases, the sensor(s) on the drive component(s) 612 may overlap or supplement corresponding systems of the vehicle 602 (e.g., sensor(s) 606).

The drive component(s) 612 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 612 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 612. Furthermore, the drive component(s) 612 may also include one or more communication connection(s) that enable communication by the respective drive component with one or more other local or remote computing device(s).

The vehicle computing device(s) 604 may include processor(s) 614 and memory 616 communicatively coupled with the one or more processors 614. Computing device(s) 634 may also include processor(s) 636, and/or memory 638. The processor(s) 614 and/or 636 may be any suitable processor capable of executing instructions to process data and perform operations as described herein. By way of example and not limitation, the processor(s) 614 and/or 636 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 616 and/or 638 may be examples of non-transitory computer-readable media. The memory 616 and/or 638 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 616 and/or memory 638 may store a perception component 618, localization component 620, planning component 622, map(s) 624, driving log data 626, prediction component 628, tracker component and/or system controller(s) 632—zero or more portions of any of which may be hardware, such as GPU(s), CPU(s), and/or other processing units.

The perception component 618 may detect object(s) in in an environment surrounding the vehicle 602 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 618 is referred to as perception data. The perception component 618 may be configured to associate a bounding region (or other indication) with an identified object. The perception component 618 may be configured to associate a confidence score associated with a classification of the identified object with an identified object. In some examples, objects, when rendered via a display, can be colored based on their perceived class. The object classifications determined by the perception component 618 may distinguish between different object types such as, for example, a passenger vehicle, a pedestrian, a bicyclist, motorist, a delivery truck, a semi-truck, traffic signage, and/or the like.

In at least one example, the localization component 620 may include hardware and/or software to receive data from the sensor(s) 606 to determine a position, velocity, and/or orientation of the vehicle 602 (e.g., one or more of an x-, y-, z-position, roll, pitch, or yaw). For example, the localization component 620 may include and/or request/receive map(s) 624 of an environment and can continuously determine a location, velocity, and/or orientation of the autonomous vehicle 602 within the map(s) 624. In some instances, the localization component 620 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 620 may provide data to various components of the vehicle 602 to determine an initial position of an autonomous vehicle for generating a trajectory and/or for generating map data, as discussed herein. In some examples, localization component 620 may provide, to the perception component 618, a location and/or orientation of the vehicle 602 relative to the environment and/or sensor data associated therewith.

The planning component 622 may receive a location and/or orientation of the vehicle 602 from the localization component 620 and/or perception data from the perception component 618 and may determine instructions for controlling operation of the vehicle 602 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 632 and/or drive component(s) 612 may parse/cause to be carried out, second instructions for the emitter(s) 608 may be formatted according to a second format associated therewith). The instructions may be provided in the form of a trajectory to the tracker component 630. The trajectory may define an intended path for the vehicle 602 to follow. The tracker component 630 may process the trajectory, and may generate a control signal for the system controller(s) 632 and/or drive component(s) 612 to control the vehicle. The tracker component 630 may implement the methods described herein, in particular in relation to FIGS. 1-5, to process the trajectory using position-based processing (e.g. spatial projection) and/or time-based processing.

The driving log data 626 may comprise sensor data, perception data, and/or scenario labels collected/determined by the vehicle 602 (e.g., by the perception component 618), as well as any other message generated and or sent by the vehicle 602 during operation including, but not limited to, control messages, error messages, etc. In some examples, the vehicle 602 may transmit the driving log data 626 to the computing device(s) 634. The computing device(s) 634 may identify one or more scenarios based at least in part on the log data, which may also comprise defining a scenario, wherein the scenarios are used to generate a playback simulation. For example, the computing device(s) 634 may determine an environmental layout, a number, type, and a configuration of object(s) in the environment and/or associate this definition with one or more portions of log data associated with that scenario. In some examples, the driving log data 626 may comprise (historical) perception data that was generated on the vehicle 602 during operation of the vehicle.

The prediction component 628 may generate one or more probability maps representing prediction probabilities of possible locations of one or more objects in an environment. For example, the prediction component 628 may generate one or more probability maps for vehicles, pedestrians, animals, and the like within a threshold distance from the vehicle 602. In some examples, the prediction component 628 may measure a track of an object and generate a discretized prediction probability map, a heat map, a probability distribution, a discretized probability distribution, and/or a trajectory for the object based on observed and predicted behavior. In some examples, the one or more probability maps may represent an intent of the one or more objects in the environment. In some examples, the planning component 622 may be communicatively coupled to the prediction component 628 to generate predicted trajectories of objects in an environment. For example, the prediction component 628 may generate one or more predicted trajectories for objects within a threshold distance from the vehicle 602. In some examples, the prediction component 628 may measure a trace of an object and generate a trajectory for the object based on observed and predicted behavior. Although prediction component 628 is shown on a vehicle 602 in this example, the prediction component 628 may also be provided elsewhere, such as in a remote computing device as shown in FIG. 6. In some embodiments, a prediction component may be provided at both a vehicle and a remote computing device. These components may be configured to operate according to the same or a similar algorithm.

The memory 616 and/or 638 may additionally or alternatively store a mapping system, a planning system, a ride management system, etc. Although perception component 618 and/or planning component 622 are illustrated as being stored in memory 616, perception component 618 and/or planning component 622 may include processor-executable instructions, machine-learned model(s) (e.g., a neural network), and/or hardware.

As described herein, the localization component 620, the perception component 618, the planning component 622, the prediction component 628, and/or other components of the system 600 may comprise one or more ML models. For example, the localization component 620, the perception component 618, the planning component 622, and/or the planning component 628 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAD)), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-60, ResNet-101, VGG, DenseNet, PointNet, and the like. In some examples, the ML model discussed herein may comprise PointPillars, SECOND, top-down feature layers (e.g., see U.S. patent application Ser. No. 16/963,833, which is incorporated in its entirety herein), and/or VoxelNet. Architecture latency optimizations may include MobilenetV2, Shufflenet, Channelnet, Peleenet, and/or the like. The ML model may comprise a residual block such as Pixor, in some examples.

Memory 620 may additionally or alternatively store one or more system controller(s) 632, which may be configured to control steering, propulsion, braking, safety, emitters, communication, and other systems of the vehicle 602. These system controller(s) 632 may communicate with and/or control corresponding systems of the drive component(s) 612 and/or other components of the vehicle 602.

It should be noted that while FIG. 6 is illustrated as a distributed system, in alternative examples, components of the vehicle 602 may be associated with the computing device(s) 634 and/or components of the computing device(s) 634 may be associated with the vehicle 602. That is, the vehicle 602 may perform one or more of the functions associated with the computing device(s) 634, and vice versa.

EXAMPLE CLAUSES

A: A system comprising: one or more processors; and one or more non-transitory computer-readable media storing instructions that, when executed, cause the system to perform operations comprising: receiving a trajectory for controlling an autonomous vehicle, the trajectory comprising a first sequence of states for controlling the vehicle in a time period, and a second sequence of states for controlling the vehicle outside of the time period; determining that a first projected time is within the time period; determining, based at least in part on the first projected time and the first sequence of states, a first control for controlling the vehicle; determining that a second projected time is outside of the time period; determining, based at least in part on a spatial projection of the vehicle at the second projected time and the second sequence of states, a second control for controlling the vehicle; and controlling the vehicle based at least in part on one or more of the first or second control.

B: The system of clause A, wherein the second sequence of states is for controlling the vehicle after the time period, and wherein a final state of the first sequence of states and an initial state of the second sequence of states comprise a common control value.

C: The system of clause A or clause B, wherein the trajectory defines a desired vehicle maneuver, and wherein the first sequence of states is generated based at least in part on identifying that the desired vehicle maneuver is in a predetermined group of vehicle maneuvers.

D: The system of clause C, wherein the predetermined group of vehicle maneuvers comprises accelerating from a stationary position or changing a steering angle while the vehicle is stationary.

E: The system of any of clauses A to D, wherein the operations further comprise: determining, based at least in part on a spatial projection of the vehicle at the first projected time, a third control for controlling the vehicle; and replacing the third control with the first control.

F: The system of any of clauses A to E, wherein the operations further comprise: determining, based at least in part on a spatial projection of the vehicle at the first projected time, a fourth control for controlling the vehicle; and controlling the vehicle based at least in part on the fourth control.

G: A method comprising: receiving a trajectory for controlling a vehicle; identifying a first mode or a second mode as a control mode for controlling the vehicle, wherein: the first mode comprises determining, based at least in part on the trajectory and a time, a first control value for the vehicle, and controlling the vehicle based at least in part on the first control value; and the second mode comprises determining, based at least in part on the trajectory and a position of the vehicle, a second control value for the vehicle, and controlling the vehicle based at least in part on the second control value; and controlling the vehicle in accordance with the control mode.

H: The method of clause G, comprising identifying the first mode or the second mode as the control mode based on determining that a parameter associated with the vehicle is in a parameter range received.

I: The method of clause H, wherein the parameter range comprises a set of timestamps.

J: The method of any of clauses G to I, wherein the first mode comprises temporally interpolating between a first state of the vehicle and a second state of the vehicle.

K: The method of any of clauses G to J, wherein the second mode comprises spatially interpolating between a third state of the vehicle and a fourth state of the vehicle.

L: The method of any of clauses G to K, wherein the second mode comprises projecting the position of the vehicle onto a path defined in the trajectory to determine a projected position, and determining the second control value from the trajectory based on the projected position.

M: The method of any of clauses G to L, wherein one or more of the first control value or second control value specifies a position, yaw, yaw rate, sideslip, velocity, time, or acceleration for the vehicle.

N: The method of any of clauses G to M, comprising controlling the vehicle in accordance with the first mode at a first time, and controlling the vehicle in accordance with the second mode at a second time.

O: One or more non-transitory computer-readable media storing instructions executable by one or more processors, wherein the instructions, when executed, cause the one or more processors to perform operations comprising: receiving a trajectory for controlling a vehicle; identifying a first mode or a second mode as a control mode for controlling the vehicle, wherein: the first mode comprises determining, based at least in part on the trajectory and a time, a first control value for the vehicle, and controlling the vehicle based at least in part on the first control value; and the second mode comprises determining, based at least in part on the trajectory and a position of the vehicle, a second control value for the vehicle, and controlling the vehicle based at least in part on the second control value; and controlling the vehicle in accordance with the control mode.

P: The one or more non-transitory computer-readable media of clause O, wherein the trajectory comprises a first sequence of states associated with the first mode, and a second sequence of states associated with the second mode.

Q: The one or more non-transitory computer-readable media of clause O or clause P, wherein a state of the first sequence of states specifies a desired value of a vehicle parameter at a particular time, and wherein a state of the second sequence of states specifies a desired value of a vehicle parameter at a particular position.

R: The one or more non-transitory computer-readable media of any of clauses O to Q, wherein the first control value specifies a desired value of a vehicle parameter; and the first mode comprises controlling the vehicle based at least in part on a difference between the desired value and an actual value of the vehicle parameter.

S: The one or more non-transitory computer-readable media of any of clauses O to R, wherein the trajectory is associated with a stationary vehicle.

T: The one or more non-transitory computer-readable media of any of clauses O to S, wherein the first mode comprises: determining a third control value based at least in part on the trajectory and the position of the vehicle; and replacing the third control value with the first control value.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into subcomputations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow charts, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
   one or more processors; and
   one or more non-transitory computer-readable media storing instructions that, when executed, cause the system to perform operations comprising:
   receiving a trajectory for controlling an autonomous vehicle, the trajectory comprising a first temporal sequence of states for controlling the vehicle in a time period, and a second spatial sequence of states for controlling the vehicle outside of the time period;
   determining that a first projected time is within the time period;
   determining, based at least in part on the first projected time and the first temporal sequence of states, a first control for controlling the vehicle;
   determining that a second projected time is outside of the time period;
   determining, based at least in part on a spatial projection of the vehicle at the second projected time and the second spatial sequence of states, a second control for controlling the vehicle; and controlling the vehicle based at least in part on one or more of the first or second control.

2. The system of claim 1, wherein the second spatial sequence of states is for controlling the vehicle after the time period, and wherein a final state of the first temporal sequence of states and an initial state of the second spatial sequence of states comprise a common control value.

3. The system of claim 1, wherein the trajectory defines a desired vehicle maneuver, and wherein the first temporal sequence of states is generated based at least in part on identifying that the desired vehicle maneuver is in a predetermined group of vehicle maneuvers.

4. The system of claim 3, wherein the predetermined group of vehicle maneuvers comprises accelerating from a stationary position or changing a steering angle while the vehicle is stationary.

5. The system of claim 1, wherein the operations further comprise:

determining, based at least in part on a spatial projection of the vehicle at the first projected time, a third control for controlling the vehicle; and replacing the third control with the first control.

6. The system of claim 1, wherein the operations further comprise:

determining, based at least in part on a spatial projection of the vehicle at the first projected time, a fourth control for controlling the vehicle; and controlling the vehicle based at least in part on the fourth control.

7. A method comprising:

receiving a trajectory for controlling a vehicle;

identifying a first mode or a second mode as a control mode for controlling the vehicle, wherein:

the first mode comprises determining, based at least in part on a temporal state of the trajectory and a time, a first control value for the vehicle, and controlling the vehicle based at least in part on the first control value; and the second mode comprises determining, based at least in part on a spatial state of the trajectory and a position of the vehicle, a second control value for the vehicle, and controlling the vehicle based at least in part on the second control value; and controlling the vehicle in accordance with the control mode.

8. The method of claim 7, comprising identifying the first mode or the second mode as the control mode based on determining that a parameter associated with the vehicle is in a parameter range received.

9. The method of claim 8, wherein the parameter range comprises a set of timestamps.

10. The method of claim 7, wherein the first mode comprises temporally interpolating between a first state of the vehicle and a second state of the vehicle.

11. The method of claim 7, wherein the second mode comprises spatially interpolating between a third state of the vehicle and a fourth state of the vehicle.

12. The method of claim 7, wherein the second mode comprises projecting the position of the vehicle onto a path defined in the trajectory to determine a projected position, and determining the second control value from the trajectory based on the projected position.

13. The method of claim 7, wherein one or more of the first control value or second control value specifies a position, yaw, yaw rate, sideslip, velocity, time, or acceleration for the vehicle.

14. The method of claim 7, comprising controlling the vehicle in accordance with the first mode at a first time, and controlling the vehicle in accordance with the second mode at a second time.

15. One or more non-transitory computer-readable media storing instructions executable by one or more processors, wherein the instructions, when executed, cause the one or more processors to perform operations comprising:

receiving a trajectory for controlling a vehicle;

identifying a first mode or a second mode as a control mode for controlling the vehicle, wherein:

the first mode comprises determining, based at least in part on a temporal state of the trajectory and a time, a first control value for the vehicle, and controlling the vehicle based at least in part on the first control value; and the second mode comprises determining, based at least in part on a spatial state of the trajectory and a position of the vehicle, a second control value for the vehicle, and controlling the vehicle based at least in part on the second control value; and controlling the vehicle in accordance with the control mode.

16. The one or more non-transitory computer-readable media of claim 15, wherein the trajectory comprises a first sequence of states associated with the first mode, and a second sequence of states associated with the second mode.

17. The one or more non-transitory computer-readable media of claim 16, wherein a state of the first sequence of states specifies a desired value of a vehicle parameter at a particular time, and wherein a state of the second sequence of states specifies a desired value of a vehicle parameter at a particular position.

18. The one or more non-transitory computer-readable media of claim 15, wherein the first control value specifies a desired value of a vehicle parameter; and the first mode comprises controlling the vehicle based at least in part on a difference between the desired value and an actual value of the vehicle parameter.

19. The one or more non-transitory computer-readable media of claim 15, wherein the trajectory is associated with a stationary vehicle.

20. The one or more non-transitory computer-readable media of claim 15, wherein the first mode comprises:

determining a third control value based at least in part on the trajectory and the position of the vehicle; and replacing the third control value with the first control value.

* * * * *